(No Model.)
I. G. TINNEY.
NUT AND BOLT LOCK.
No. 518,974.        Patented May 1, 1894.
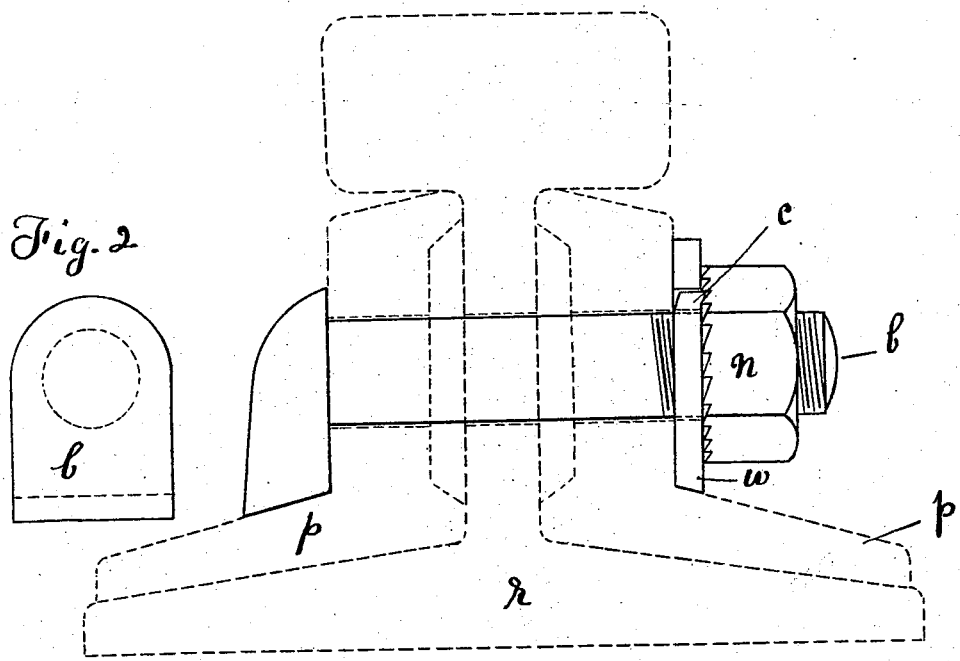
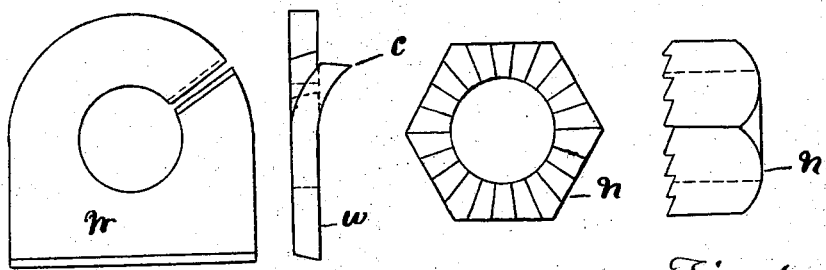
WITNESSES
C. C. Woodworth
George Burrows
INVENTOR
Isaac G. Tinney
By L. D. Woodworth
Attorney

UNITED STATES PATENT OFFICE.

ISAAC G. TINNEY, OF YOUNGSTOWN, OHIO.

NUT AND BOLT LOCK.

SPECIFICATION forming part of Letters Patent No. 518,974, dated May 1, 1894.

Application filed October 1, 1892. Serial No. 447,570. (No model.)

*To all whom it may concern:*

Be it known that I, ISAAC G. TINNEY, a citizen of the United States, residing at Youngstown, in the county of Mahoning and State of Ohio, have invented certain new and useful Improvements in Lock Nuts and Bolts; and I do hereby declare the following to be a full, clear, and exact description of my invention, such as will enable others skilled in the art to which it appertains to make and use the same, reference being had to the accompanying drawings, which form part of this specification.

My invention relates to that class of lock nut and bolt devices used with fish-plates in joining rail road rails in which a washer co-operates to secure a lock of the nut, and its object is in a device that will accomplish a lock of the nut on the bolt that will be maintained against all forces coming to it through the rails that tend to loosen other so called lock nuts, and which, without injury to any part may be readily applied and displaced, and as often as desired. I accomplish this by the mechanism hereinafter described and illustrated in the drawings, in which—

Figure 1 is a transverse section view of the rail $r$ and fish-plates $p$ $p$ held in position by my invention. Fig. 2 is an end view of the head of my bolt $b$. Fig. 3 is a face or side view of my pawl-washer $w$. Fig. 4 is an edge view of the same, illustrating the spring ratchet catch $c$ therein. Fig. 5 is a view of the ratchet end of the nut $n$; and Fig. 6 is a side view of the same.

Similar letters indicate similar parts in all views.

The causes which operate to loosen the nut by turning it backward are the slight rocking or partial rotation of the bolt induced by the slight movements of the rail, in alternating track line directions, resulting from the powerful force of passing trains, and the similar movements imparted to the nut by reason of the necessary contacts of the nut, fish-plate, and rail. To successfully defend therefore the nut and bolt from such movements is to secure and maintain a lock of the nut, and my invention proceeds upon this idea.

The bolt $b$ differs from other bolts used for similar purposes only in the form and bulk of the head. As is seen at Figs. 1 and 2, a side of the head is prolonged terminating in a flat surface having such line of incline as will allow it at all points to equally rest upon the upper surface of the horizontal part or foot of the fish-plate $p$, while the opposite side of the head is spherically rounded on the three sides opposite the shoulder to escape the flanges of the car wheels. The pawl-washer $w$ is a piece of flat spring steel, rectangular, except rounded on its upper edge, like other washers provided with an opening for the passage of the bolt $b$ and prolonged in the same manner, and for the same purpose, as the above described bolt head. From the perimeter upon the side over which the nut in being turned to place passes upward, a cut is made to the opening on a line at or below its vertical center, and the lower edge of the severed part is curved outward forming the pawl $c$ to engage in the ratchets that appear on the inner side of the nut $n$ and hold it from turning backward, the length of the pawl $c$ being such that the nut will never become freed by expansion of the bolt.

In the manufacture of the washer $w$ the pawl $c$ is formed by the die that cuts out the washer from hot metal so that it maintains, except when sprung backward, the position shown at Fig. 4. The nut $n$ is the common interiorly threaded nut having cut into its inner end from the outer side to the central opening a continuous series of similar ratchets, as illustrated at Figs. 5 and 6.

My invention will now be understood and its manner of use and efficiency will be comprehended. To apply it, the bolt $b$ is passed through the fish-plates $p$ $p$ and the rail $r$, the washer $w$ is passed over the threaded end of the bolt $b$ to position against the fish-plate $p$ with the pawl $c$ outward, as seen at Fig. 1, and the nut $n$ is then turned to place snugly against the washer $w$, the pawl $c$ resting in a ratchet with its edge against a shoulder. Inasmuch as the bolt $b$ and washer $w$ are held rigidly from turning by the rest that each has upon the foot of the fish-plates $p$ $p$, and the nut is also held firmly against backward turn, by the pawl c acting in a ratchet of the nut n, it follows that it is impossible for the nut to become loosened except by intentional cause. It may be removed, however, with the greatest facility by the use of a socket wrench which pushes and holds back the pawl c as it turns the nut backward beyond its reach. Thus have I fully accomplished the object stated in the beginning of this specification.

While I have illustrated and described my invention as applied in joining railroad rails, I intend it for such other uses as it may be applied to, as for instance, in iron bridge building and in other structures where a nut and bolt that will never become loosened by stress or accidental cause, are desirable.

I am aware that ratchet nuts are old in nut lock devices, as are also catches in the washers used therewith, but I am not aware that either a bolt having a head so prolonged upon one side that it impinges the fish-plate foot, or that a washer similar in form to a vertical section of such bolt head and carrying the spring ratchet catch c was ever known prior to my invention thereof.

What I claim is—

In a nut and bolt lock for joining rail road rails in combination the bolt b threaded on one end and at the other end provided with a head sufficiently prolonged on one side to impinge the foot flange of the fish-plate p; the washer w prolonged in the lower portion to the foot flange of the fish-plate p, when in place, and carrying upon its side the pawl c formed by the outward curve of the lower edge made by a cut through the plate from the opening to the perimeter and upon that side over which the nut rotates upward in being turned to place; and the nut n having upon its inner end a series of ratchets, substantially as described and for the purpose expressed.

In testimony whereof I hereunto affix my signature in the presence of two witnesses.

ISAAC G. TINNEY.

Witnesses:
   THOS. CONROY,
   THEO. T. ROOK.